United States Patent
Basso et al.

(10) Patent No.: US 6,633,539 B1
(45) Date of Patent: Oct. 14, 2003

(54) DEVICE, METHOD AND ARTICLE OF MANUFACTURE FOR CALL SETUP PACING IN CONNECTION-ORIENTED NETWORKS

(75) Inventors: Claude Basso, Nice (FR); Philippe Damon, Cagnes-sur-mer (FR); Jason J. Hernandez, Kirkland, WA (US); Bernard Putois, Vence (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/351,712

(22) Filed: Jul. 12, 1999

(30) Foreign Application Priority Data

Aug. 28, 1998 (EP) ............................................ 98480059

(51) Int. Cl.[7] .................................................. H04J 1/16
(52) U.S. Cl. ........................ 370/229; 370/230; 370/235
(58) Field of Search ................................ 370/229, 230, 370/235, 235.1, 236

(56) References Cited

U.S. PATENT DOCUMENTS

| | | | |
|---|---|---|---|
| 4,348,554 A | 9/1982 | Asmuth ........................ 179/18 |
| 4,696,028 A | 9/1987 | Morganstein et al. ......... 379/88 |
| 4,737,983 A | 4/1988 | Frauenthal et al. .......... 379/221 |
| 4,757,267 A | 7/1988 | Riskin ........................ 379/113 |
| 4,788,718 A | 11/1988 | McNabb et al. ............. 379/113 |
| 5,036,535 A | 7/1991 | Gechter et al. .............. 379/210 |
| 5,109,404 A | 4/1992 | Katz et al. ..................... 379/88 |
| 5,164,983 A | 11/1992 | Brown et al. ................ 379/265 |
| 5,226,075 A | 7/1993 | Funk et al. .................. 379/243 |
| 5,271,058 A | 12/1993 | Andrews et al. ............. 379/210 |
| 5,282,244 A | 1/1994 | Fuller et al. ................. 379/230 |
| 5,291,550 A | 3/1994 | Levy et al. ................... 379/242 |
| 5,291,552 A | 3/1994 | Kerrigan et al. ............. 379/266 |
| 5,299,259 A | 3/1994 | Otto ............................ 379/221 |
| 5,309,513 A | 5/1994 | Rose ............................ 379/265 |
| 5,333,133 A | 7/1994 | Andrews et al. ............ 370/58.2 |
| 5,333,188 A | 7/1994 | Bogart et al. ................ 379/220 |
| 5,333,308 A | 7/1994 | Ananthanpillai ............. 395/575 |
| 5,335,233 A | 8/1994 | Nagy ........................... 371/32 |
| 5,381,415 A | 1/1995 | Mizutani ................. 370/110.1 |
| 5,442,691 A | 8/1995 | Price et al. .................. 379/220 |
| 5,465,286 A | 11/1995 | Clare et al. .................... 379/34 |
| 5,528,678 A | 6/1996 | Kaplan ........................ 379/201 |
| 5,530,744 A | 6/1996 | Charalambous et al. .... 379/265 |
| 5,590,188 A | 12/1996 | Crockett ...................... 379/225 |
| 5,592,477 A | 1/1997 | Farris et al. ................. 370/396 |
| 5,633,924 A | 5/1997 | Kaish et al. ................. 379/266 |
| 5,649,108 A | 7/1997 | Spiegel et al. .......... 395/200.12 |
| 5,689,518 A | 11/1997 | Galand et al. .............. 371/37.1 |
| 5,694,407 A | 12/1997 | Glaise ........................... 371/53 |

(List continued on next page.)

OTHER PUBLICATIONS

GeoTel Intelligent Call Router, *Managing the Interaction Between Customer and Answering Resources*, Mar. 1997, pp. 1–9.

GeoTel Intelligent Call Router, *Delivering the Right Information to the Right Resource for Every Customer Interaction*, Copyright 1999, pp. 1–11.

GeoTel Network Intelligent Call Router, *Differentiating Your Network with Enhanced Service Offerings, Virtual Call Center and CTI Capabilities*, pp. 1–8.

*Primary Examiner*—Wellington Chin
*Assistant Examiner*—William Schultz
(74) *Attorney, Agent, or Firm*—Cesari and McKenna, LLP

(57) ABSTRACT

A method, system and article of manufacture to prevent signaling congestion in a connection-oriented network node in situations where a plurality of network-attached data terminal equipments (source DTEs) concurrently request a connection to at least one network-attached data terminal equipment (destination DTE), each of the source DTEs sending call setup messages (CSMs) through the network node to the at least one destination DTE. The CSMs having to be processed by the network to establish the connections requested.

15 Claims, 4 Drawing Sheets

Access to a File Server in CIP

U.S. PATENT DOCUMENTS

| | | | |
|---|---|---|---|
| 5,715,306 A | 2/1998 | Sunderman et al. | 379/265 |
| 5,757,895 A | 5/1998 | Aridas et al. | 379/136 |
| 5,787,160 A | 7/1998 | Chaney et al. | 379/220 |
| 5,787,163 A | 7/1998 | Taylor et al. | 379/265 |
| 5,848,143 A | 12/1998 | Andrews et al. | 379/219 |
| 5,873,130 A | 2/1999 | Lafferty | 2/16 |
| 5,878,130 A | 3/1999 | Andrews et al. | 379/265 |
| 6,072,773 A | 6/2000 | Fichou et al. | 370/230 |
| 6,212,164 B1 * | 4/2001 | Murakami et al. | 370/230 |

* cited by examiner

Call Pacing Function Location

Call Pacing Procedure

Connection Setup Acknowledgement Processing

Access to a File Server in CIP

DEVICE, METHOD AND ARTICLE OF MANUFACTURE FOR CALL SETUP PACING IN CONNECTION-ORIENTED NETWORKS

TECHNICAL FIELD

This invention relates to signaling congestion control in connection-oriented networks and more particularly to controlling network congestion due to a high number of network-attached devices demanding simultaneously access to a common network-attached resource.

BACKGROUND ART

Modern data terminal equipments (DTEs) attached to connection-oriented networks have a very high processing capacity and are consequently very demanding in terms of connections to the network. In order to establish a connection, a data terminal equipment must exchange a signaling protocol message with the network, commonly called "call setup message". Network access switching nodes can support a large number of attached-to devices and therefore may process hundreds of call setup messages simultaneously. In large networks nodes may even process thousands of such call setup messages in a very short time.

In some situations, a burst of simultaneous call setup messages may flow into a network causing congestion. For example, when a common resource such as a file server goes down all attached-to devices will attempt to reconnect simultaneously. This congestion may take place either at a network input access node that supports numerous devices requesting the common resource or at the output access node where the common resource attaches to the network.

Such a situation arises in a LAN (local area network) environment when based on a protocol such as ATM (asynchronous transfer mode). Most of the existing ATM LANs rely on the emulation of well-known higher layer LAN protocols such as Ethernet, Token-Ring or Internet Protocol (IP), thereby creating a virtual LAN over the ATM layer. This LAN emulation is enabled by using dedicated protocols, the most widespread being the so-called "Classical IP over ATM" protocol and the so-called "LAN Emulation over ATM" protocol. In each case, a protocol server is required to manage the virtual LAN over the ATM layer, and consequently, any terminal device that wants to enter the virtual LAN must connect to this protocol server prior to proceeding with any other activity such as data transmission. Thus, signaling congestion may occur when too many data terminal equipments (DTEs) try to connect simultaneously to the protocol server.

Several approaches can be used to address this type of signaling congestion problem. One approach consists in "just doing nothing", that is, let the network recover from congestion by itself. When bursts of call setup messages are received, many of them are rejected. The rejected devices will retry to connect, and hopefully the connection requests will desynchronize with over time so as not to create a congestion state again. Unfortunately, there is no guarantee that the connection requests will desynchronize. Also the time interval for the requests to desynchronize is not determinable. Furthermore, this approach is not scalable in that if more devices share the same resource, the congestion will worsen. Therefore, this approach is not satisfactory in the context of a high speed/performance network.

Another approach is to increase the processing power of the switching nodes. This would be acceptable if networks were static and not continuing to increase in size and utilization. Networks grow faster than the processing power of the switching nodes which makes this approach a short term solution. Therefore, unsatisfactory.

Still another approach is to implement random timers in the terminal devices to manage the retry procedure. The random timers can induce the desynchronizing of all the source devices requesting connections, and therefore, they can naturally pace the call Setup messages. This approach is similar to the so-called Ethernet Backoff Timer method which is commonly implemented to solve access collision problems. However, it has the disadvantage that it depends on changes to the devices that connect to the network. This makes implementing difficult given multi-vendor multiproduct nature of most devices attaching to a network. Furthermore, no standard appears to exists that requires the terminal devices to implement such mechanisms. Finally, it is not desirable to rely on the behavior of unknown devices to protect a switching node and the network from call setup congestion.

Yet a further approach consists in limiting the number of call setup messages in the switching node in order to protect it against an overflow of such call setup messages. This solution is not very efficient since it induces a random discarding of the pending call setup requests. This can be prejudical for example, when, as it may happen, a group of connections has to be established in such a way that, if only one connection from the group fails, then all the group is torn down and the whole group must be re-established. For instance, this is the case for the control connections in LAN Emulation. Furthermore, this technique is not fair as all the users are penalized while only a few of them may have caused the congestion.

Therefore, there is a need for a solution to the above problems of the prior art that provides efficient protection to network devices from call setup overflow, while assuring the scalability of the networks. Such a solution is provided by the present invention as described hereinafter.

SUMMARY OF THE INVENTION

An object of the present invention is to provide a method for keeping control of concurrent connections setup requests in a switching node of a connection-oriented network to provide efficient protection against signaling congestion.

Another object of the invention is to provide a switching node of a connection-oriented network with a system to protect efficiently against call setup message overflow.

In accordance with the appended set of claims, these objects are achieved by providing a method and a system to prevent signaling congestion in a connection-oriented network node in situations where a plurality of network-attached data terminal equipments (source DTEs or source devices) concurrently request a connection to at least one network-attached data terminal equipment (destination DTE or destination device), each of the source DTEs sending call setup messages (CSMs) through the network node to the at least one destination DTE. The CSMs are processed by the network to establish the request connections. The method comprises the steps of: predefining a threshold number (Max) as the maximum number allowed of CSMs from the source DTEs that are actually being processed by the network at a given instant, and predefining a time frame (Window) as the time frame within which no more than Max CSMs are accepted by the network for being processed; detecting each new incoming CSM in the network node; rejecting each new incoming CSM if a number of CSMs equal to Max are already being processed by the network, or if less than Max CSMs are actually being processed by the network, while Max CSMs have already been accepted to be processed during current Window, accepting each new incoming CSM otherwise. The step of detecting each new incoming CSM is optionally followed by a further step of filtering each new incoming CSM to determine whether the CSM satisfies or not at least one predefined filtering criterion, and accepting the incoming CSM if it does not satisfy any of said at least one predefined criterion, or proceeding further with the following steps of the method otherwise.

BRIEF DESCRIPTION OF THE DRAWINGS

An embodiment of the invention will now be described, by way of example only, with reference to the accompanying drawings, wherein.

DETAILED DESCRIPTION OF THE INVENTION

The call pacing system of the present invention is embodied in an ATM high speed network and more particularly, it is implemented at network node level within the Call Admission Control (CAC) module, that is, the module that determines whether a call can be accepted. Accordingly, the call pacing system of the present invention can be considered as a CAC extension. Furthermore, the call pacing system may be implemented in the access nodes of the network where the data terminal equipments or devices attach or in every node of the network (access or intermediate node). In the preferred embodiment, the call pacing system is implemented in the access nodes in the form of a software system.

The preferred embodiment of the present invention contains one or more software systems or software components or functions. In this context, a software system is a collection of one or more executable software programs, and one or more storage areas (for example, RAM, ROM, cache, disk, flash memory, PCMCIA, CD-ROM, Server's Memory, ftp accessible memory, etc.). In general terms, a software system should be understood to comprise a fully functional software embodiment of a function or collection of functions, which can be added to an existing processing system to provide new function to that processing system. A software system is thus understood to be a software implementation of a function which can be carried out in a processor system providing new functionality. It should be understood in the context of the present invention that delineations between software systems are representative of the preferred implementation. However, the present invention may be implemented using any combination or separation of software or hardware systems. Software systems may be distributed on a computer usable medium such as floppy disk, diskettes, CD-ROM, PCMCIA cards, flash memory cards and/or any other computer or processor usable medium. Note that the software system may also be downloaded to a processor via a communications network or from an Internet node accessible via a communications adapter.

Figure 1:
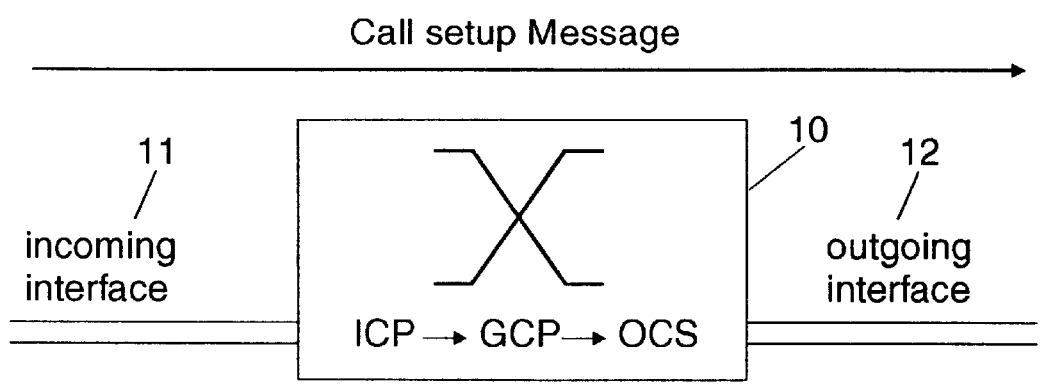
FIG. 1 shows the call pacing system of the present invention within a switching node of a high speed packet switching network.

Referring to FIG. 1, a switching node 10 of a high speed packet switching network comprises an incoming interface 11 which receives incoming packets through one or more input ports, and an outgoing interface 12 which forwards received packets through one or more output ports. The call pacing may be implemented at three different points (referred herein to as call pacing points) within switching node 10. First call pacing point "ICP" stands for "Incoming Call Policing". In this configuration, the call pacing is performed at one or more input ports of the switching node 10 and applies to the incoming call setup messages. The second call pacing point "OCS" stands for "Outgoing Call Shaping". In this configuration call pacing is performed at one or more output ports and the pacing is performed on outgoing call setup messages. The last call pacing point "GCP" stands for "Global Call Pacing". In this configuration call pacing is performed globally in the switch on all I/O ports in the same way. Finally, call pacing of the present invention may be performed at each call pacing point independently of the other call pacing points. Any combination of call pacing points in which call pacing is performed concurrently may also be obtained.

Call pacing of the present invention makes use of a "thresholding" technique and a "windowing" technique as explained hereafter. A counter CNT is dedicated to count the call setup messages (in packet or cell format) which arrive in the switching node. A predefined number Max called "call setup threshold" defines a maximum allowed number of concurrent connection requests (i.e., call setup messages) that are actually being processed by the network at a given time. Furthermore, a time frame called "Window" is defined as the time frame within which no more than Max call setup messages are allowed to be accepted by call pacing for processing, even if less than Max concurrent connections are actually being set up. Indeed, when a connection is set up after the corresponding call setup message has been processed by the network, the destination data terminal equipment (DTE) sends an acknowledgment message (in the form of packets or cells) through the switching node to the source DTE which requested the connection. These acknowledgment messages are used to decrement counter CNT.

Additionally, the present invention may use a "call pacing filter" to select the call setup messages to be paced. The filtering performed is dependent on the particular implementation of the present invention and the nature of the network. For example, call setup messages may be filtered according to the destination DTE address as in one preferred embodiment, or according to characteristics of the connection requested, as the type of traffic (e.g. CBR—constant bit rate, VBR—variable bit rate) or as the associated QoS (quality of service). If there is more than one call pacing point in the switching node, the type of filter may be different for each call pacing point. It should be noted that, while in the preferred embodiment of the present invention a filter has been implemented, the invention may be practiced without any filter at all.

Acceptance of a call setup message (CSM) by call pacing of the present invention, refers to the procedures applied to a CSM are performed, and in normal conditions, the CSM is forwarded to the next node of the path towards the destination DTE. Conversely, a CSM rejected by the call pacing of the present invention, refers to a message which is sent to the source DTE to notify that the connection request is refused, and the CSM is discarded.

Figure 2:
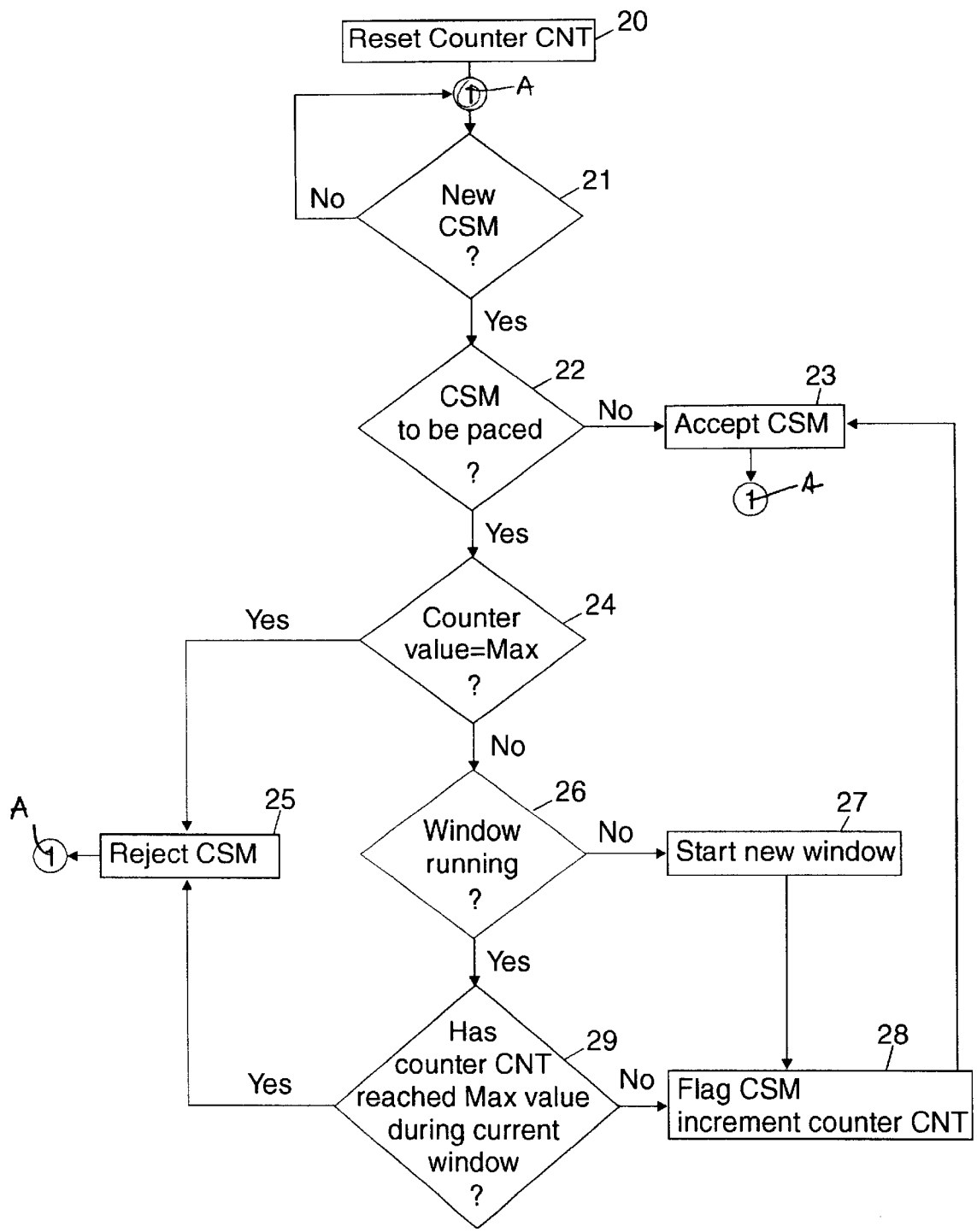
FIG. 2 is a flow chart of the call pacing system.

FIG. 2 shows the general flow chart of the call pacing procedure of the present invention. The procedure starts by init step in box 20 where counter CNT is reset (i.e. set to zero). The init step may be run when the first call setup message is received. The time frame (Window) may also be started when the first call setup message is received. In step 21 a check is made to detect if a new CSM was received at the call admission control module of the switching node. If there is no new CSM received (No), the system recycles for new CSM detection. If a new CSM is detected (Yes), step 22 is performed which filters the CSM received to determine whether this CSM corresponds to a connection request satisfying at least one of the filtering criteria (i.e. a connection request to be processed by the call pacing system). A filter criteria may be, for example, the CSM destination address is a predetermined file server attached to the network. If the CSM does not satisfy the filtering criteria (No) the CSM is accepted in step 23 and the CSM is processed for the corresponding connection to be set up and the procedure returns to wait for a new CSM in step 21 via A. However, If the CSM in step 22 satisfies one of the filtering criteria (Yes), the CSM must be "paced" and step 24 is entered. In step 24, the value of the to-be-paced call setup messages counter CNT is compared to threshold value Max, which defines the maximum allowed number of concurrent CSM that are actually being processed by the network at the present instant. If counter CNT has already reached number Max (Yes) then current call setup message is rejected in step 25 and the procedure returns to wait for a new CSM in step 21 via A. If counter CNT has not reached Max (No), then the counter CNT is strictly less than Max (but superior or equal to zero), then step 26 tests whether a current time frame (Window) is running or not. If no current time frame (Window) is running (No), a new Window is started in step 27, and the CSM is flagged in a memory table and message counter is incremented in step 28 as a new connection corresponding to current CSM will be set up, then the connection corresponding to current CSM is accepted for processing at step 23 for the corresponding connection to be set up. The flag set in step 28 is further used each time a call setup acknowledgment is received indicating that a connection has been set up, to determine whether the corresponding CSM was processed or not by the call pacing system. If so, counter CNT will be decremented as a concurrent connection request has been processed and completed. The acknowledgment processing procedure will be more detailed further in the description in connection with FIG. 3. Returning to step 26, if a current window is running (Yes), step 29 tests whether counter CNT has already reached threshold Max during current window (even if current value of counter CNT is less than Max). If so (Yes) then current call setup message is rejected 25 and the procedure returns to wait for a new CSM in step 21 via A. If not (No), step 28 is entered to flag current CSM as explained above, increment counter CNT, before entering box 23 to accept current CSM and process it for the corresponding connection to be set up. Note as decribed above only paced CSMs are counted.

As previously said, each time a connection between a source data transmission equipment (DTE) and a destination DTE is set up, the destination DTE sends to the source DTE an acknowledgment message (in the form of packets or cells). When the switching node in which the invention is implemented receives such an acknowledgment message, it is determined whether the corresponding connection call setup message has been processed by the call pacing system. This is done by reading a memory table containing identifiers or indicators of connections that were flagged after their call setup message was accepted and processed through the call pacing system (see FIG. 2, step 28). If so, counter CNT will be decremented as a connection request has been processed and completed.

Figure 3:
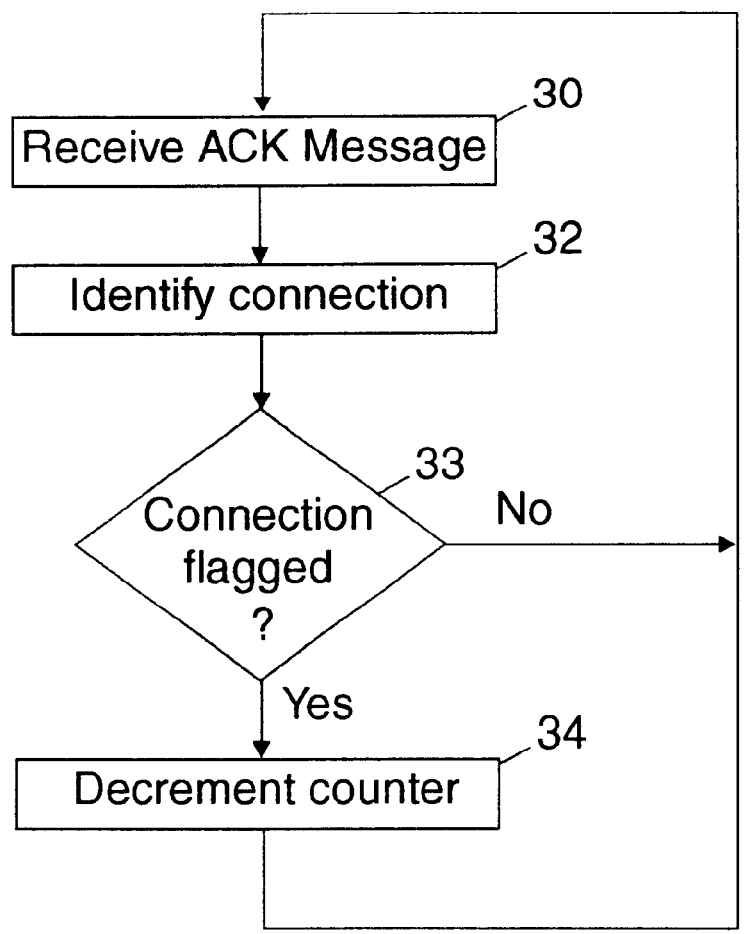
FIG. 3 is a flow chart showing the connections setup acknowledgments processing.

In FIG. 3, depicts a flow chart illustrating the connection setup acknowledgments processing according to the invention. In step 30, a call setup acknowledgment message is received. Then, in step 32, the corresponding connection is identified. Next, in step 33, it is determined whether the identified connection is a "flagged" connection as explained above. If so (Yes) counter CNT is decremented in step 34. If the identified connection has not been flagged (No), the process recycles to step 30 to receive a new acknowledgment message.

Following is a pseudo-code illustrating the implementation of the call pacing system of the invention as illustrated in FIG. 2. This pseudo-code may be implemented using a programming language such as the well-known C Language.

```
/* pseudo- code */
begin
    CNT = 0; WIN = 0;      /* Init */
    while (New_CSR_received) do
        begin
            Filter_CSR;
            if (Filter = "no") then ACCEPT_CSM /* CSM not to be paced */
            else if (CNT = Max) then REJECT_CSR
                else /* CNT < Max */
                    if (Window_Not_Running) then
                        begin
                            Start_Window;
                            Flag_CSM;
                            CNT=CNT+1;
                            WIN = CNT;
                            ACCEPT_CSM;
                        end
                    else /* window running */
                        if (WIN = Max) then REJECT_CSM
                        else begin
                            Flag_CSM;
                            CNT=CNT+1;
                            WIN=WIN+1;
                            ACCEPT_CSM;
                        end
                    endif
                endif
            endif
        end
```

Figure 4:
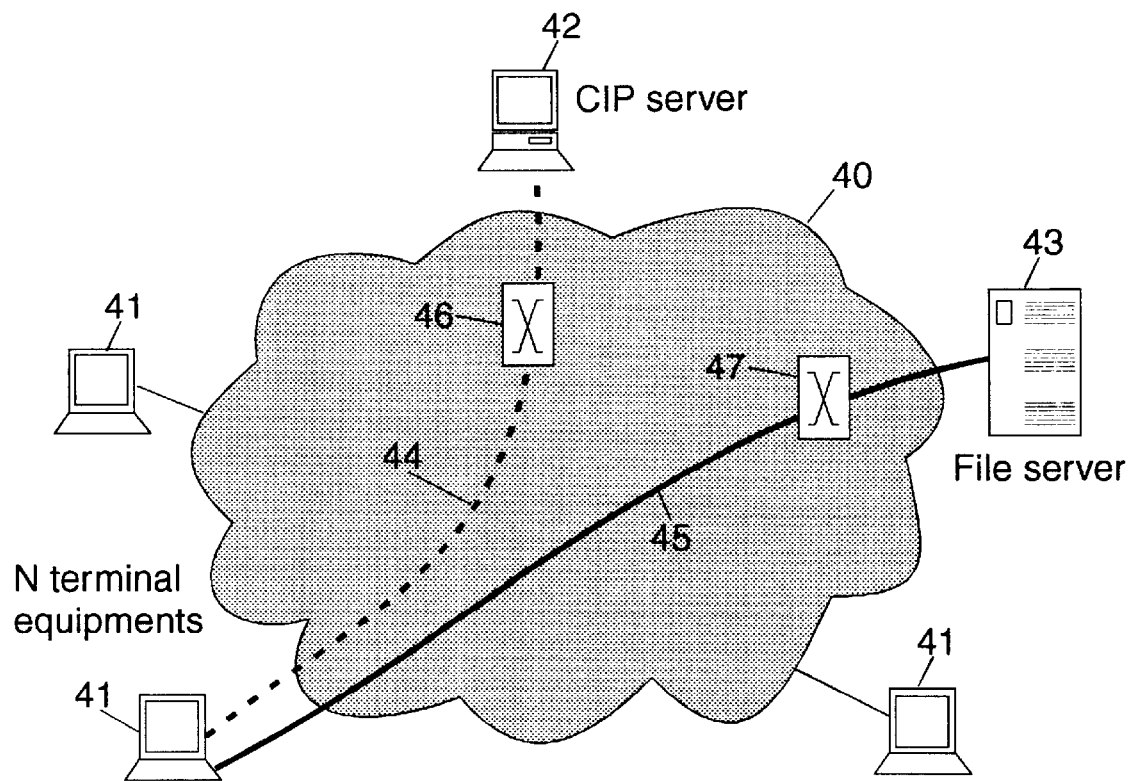
FIG. 4 is a block diagram showing an example of situation where the call pacing system of the invention may be used to solve signaling congestion problems.

FIG. 4 provides a block diagram showing an example of an environment where the call pacing techniques of the present invention may be used to reduce signaling congestion problems. This example assumes a large number of data terminal equipments (DTEs) are attached to network access nodes in an ATM network. The DTEs want to simultaneously access a file server using Classical IP over ATM protocol (CIP protocol).

Referring to FIG. 4, a number N (where N is an integer) of data terminal equipments (DTEs) 41 connect network 40 through one or more network access nodes (not shown), a CIP server 42 attaches to the network through access node 46, and a file server 43 attaches to the network through access node 47. According to CIP protocol, each of the DTEs 41 must first establish a connection 44 to the CIP server 42 (i.e. registration step), referred to as "control connection". After a DTE has registered with the CIP server 42, it must establish a data connection 45 (also called "user connection") to file server 43. Note that the file server 42 must have previously registered to CIP server 42.

CIP Server Failure Example

In the situation where all the N DTEs are connected simultaneously to file server 43 and exchange data through N data connections, suppose that for a some reason CIP server 42 is brought down for a given time period and then back up. All of the N DTEs try to reconnect to the CIP server by establishing concurrently N control connections 44 and N user connections 45. As a consequence, there may be 2*N (where "*" stands for multiply) connection requests in a very short time frame. If number N is large (e.g., in the order of hundreds to thousands), there may be signaling congestion at access node 46 which attaches CIP server 42 to the network 40. In order to prevent such congestion, the call pacing system of the invention may be implemented at access node 46 at the Global Call Pacing point (see FIG. 1). The call setup messages filtering criterion could then be set to the ATM address of CIP server 42 and the following parameters could also apply: threshold Max is set to a value G chosen in accordance with network and switching nodes performances, and the Window is set to a time value W1. Window value W1 is chosen such that any DTE can perform within the Window time frame the step of registration to the CIP server 42 and the step of connection to the file server 43. Consequently, during the Window time frame, there will be at maximum G DTEs trying to establish a control connection concurrently to the CIP server 42 and then establish a user connection to the file server 43. Therefore, in the worst case, 2*G connection requests will be handled concurrently by network node 46 during a Window time frame, and a signaling congestion at network node 46 is thereby prevented.

File Server Failure Example

If the file server 43 is brought up and down after a breakdown has occurred, then, the file server is no longer registered to the CIP server, it must first register again. During that time when the file server 43 is not registered, all the DTEs requests to the CIP server 42 for the ATM address of file server 43 are responded to "negatively". Once the file server 43 is registered again, all DTEs are able to get the ATM address of the file server 43 from the CIP server 42. Then, all DTEs 41 try to connect to file server 43 at the same time, which leads to a flow of N connection requests to file server 43 through access node 47 as shown in FIG. 4. To reduce this number of concurrent connection requests and thereby prevent signaling congestion at network node 47, the call pacing system of the invention may be implemented at access node 47. The Global Call Pacing point with threshold Max set to value G, and a Window set to a time value W2, which is chosen such that any DTE can perform within the Window time frame the step of connection (user connection) to the file server 43. The call setup message filtering criterion will be set this time to the ATM address of file server 43.

In a typical ATM network values for G may range from tens to hundreds, and W1 and W2 may be in the order of few seconds, depending on the characteristics of the networks components (nodes and links) and on the attaching DTEs.

If both the CIP server and the file server attach to the network at the same access node then, to prevent signaling congestion in the above situations, there may be two independent call pacing procedures according to the invention within the same node. One call pacing filtering on the CIP Server 42 address and another filtering on the file server 43 address.

The call pacing system of the invention may also be used to ensure that a maximum number of users can connect to a server machine without any risk of signaling congestion. Then, given a time K required by the server to process an incoming connection request and a maximum number P of potential users that can request connection to the server in parallel (P may depend on the server processing power), the parameters of the call pacing system implemented in the switching node that attaches the server could be calculated as follows. Threshold Max would be set to the number P, and Window would be set to time value W such that: W is superior to P*K (where "*" stands for multiply).

The present invention may be used with any other protocol, such as for example the LE/FC (LAN Emulation Forum Compliant) protocol in an ATM network. It may also apply to any connection-oriented network where a plurality of data terminal equipment of any type demand access through the network to a common resource.

While the invention has been described in terms of a preferred embodiment, those skilled in the art will recognize that the invention can be practiced with variations and modifications. Therefore, it is intended that the appended claims shall be construed to include both preferred embodiment and all variations and modifications thereof that fall within the scope of the invention.

What is claimed is:

1. A method to prevent signaling congestion in a connection-oriented network node comprising the steps of:
   a) predefining a threshold number (Max) as the maximum number of allowed call set up messages (CSMs) to be processed from a plurality of sources by the network node and predefining a time frame window as the time within which no more than the threshold number (Max) CSMs are accepted for processing by the network node for processing;
   b) detecting each new incoming CSM in the network node;
   c) rejecting each new incoming CSM if
      the number of CSMs currently being processed by the network node equals the threshold number (Max); or
      the number of CSMs accepted for processing during the current time frame window equals the threshold number (Max);
   d) accepting each new incoming CSM that is not rejected;
   e) filtering each new incoming CSM to determine whether said CSM satisfies at least one predefined filtering criterion, and accepting said incoming CSM if it does not satisfy any of said at least one predefined criterion, or proceeding further with the steps of c) and d) otherwise;
   f) incrementing a counter (CNT) each time an incoming CSM which has satisfied said at least one predefined criterion and was previously accepted for processing;
   g) decrementing said counter (CNT) each time an acknowledgement message which concerns a CSM which has satisfied said at least one predefined criterion and was previously accepted for processing;
   h) comparing the current value of said counter (CNT) to said threshold number (Max) to determine whether said incoming CSM should be rejected or processed further; and
   i) flagging in a memory table each accepted CSM that has satisfied said at least one predefined criterion, whereby each time an acknowledgement message is received, it is determined whether said counter (CNT) should be decremented.

2. The method according to claim 1 wherein the filtering criterion comprises a network address of at least one predetermined destination.

3. A network node adapted for use in a connection-oriented network comprising:

initialization means for predefining a threshold number (Max) as the maximum number of allowed call set up messages (CSMs) to be processed from a plurality of sources by the network node and predefining a time frame window as the time within which no more than the threshold number (Max) CSMs are accepted for processing by the network node for processing;

a detector for detecting each new incoming CSM received by the network node;

a CSM rejection means for rejecting each new incoming CSM if the number of CSMs currently being processed by the network node equals the threshold number (Max); or the number of CSMs accepted for processing during the current time frame window equals the threshold number (Max);

a CSM acceptance means for accepting each new incoming CSM that is not rejected;

a CSM filter for filtering each new incoming CSM to determine whether said CSM satisfies at least one predefined filtering criterion, and accepting said incoming CSM if it does not satisfy any of said at least one predefined criterion, or providing the CSM to the CSM rejection means otherwise;

a counter (CNT) that is incremented each time an incoming CSM which has satisfied said at least one predefined criterion and is accepted processing and is decremented each time an acknowledgement message which concerns CSM which has satisfied said at least one predefined criterion and was previously accepted for processing;

a comparator for comparing the current value of the counter (CNT) to with the threshold number (Max) to determine whether said incoming CSM should be rejected or processed further; and a memory table with each accepted CSM is flagged when it has satisfied said at least one predefined criterion, whereby each time an acknowledgement message is received, it is determined whether said counter (CNT) should be decremented.

4. The network node according to claim 3 wherein the filtering criterion comprises a network address of at least one predetermined destination.

5. An article of manufacture comprising a processor useable medium having a processor readable program embodied in said medium, wherein the processor readable program when executed on a network nodes causes the network node to:

a) predefine a threshold number (Max) as the maximum number of allowed call set up messages (CSMs) to be processed from a plurality of sources by the network node and predefine a time frame window as the time within which no more than the threshold number (Max) CSMs are accepted for processing by the network node for processing;

b) detect each new incoming CSM in the network node;

c) reject each new incoming CSM if
the number of CSMs currently being processed by the network node equals the threshold number (Max); or
the number of CSMs accepted for processing during the current time from window equals the threshold number (Max);

d) accept each new incoming CSM that is not rejected;

e) filter each new incoming CSM to determine whether said CSM satisfies at least one predefined filtering criterion, and accepting said incoming CSM if it does not satisfy any of said at least one predefined criterion, or proceeding further with the steps of c) and d) otherwise;

f) increment a counter (CNT) each time an incoming CSM which has satisfied said at least one predefined criterion and is accepted for further processing;

g) decrement said counter (CNT) each time an acknowledgement message which concerns CSM which has satisfied at least one predefined criterion and was previously accepted for further processing;

h) compare the current value of said counter (CNT) to said threshold number (Max) to determine whether said incoming CSM should be rejected or processed further; and i) flag in a memory table each accepted CSM that has satisfied said at least one predefined criterion, whereby each time an acknowledgement message is received, it is determined whether said counter (CNT) should be decremented.

6. The article of manufacture according to claim 5 wherein the filtering criterion includes a network address of at least one predetermined destination.

7. A method to prevent signaling congestion in a connection-oriented network node comprising the steps of:

a) predefining a threshold number (Max) as the maximum number of allowed call set up messages (CSMs) to be processed from a plurality of sources by the network node and predefining a time frame window as the time within which no more than the threshold number (Max) CSMs are accepted for processing by the network node for processing;

b) detecting each new incoming CSM in the network node;

c) rejecting each new incoming CSM if
the number of CSMs currently being processed by the network node equals the threshold number (Max); or
the number of CSMs accepted for processing during the current time frame window equals the threshold number (Max);

d) accepting each new incoming CSM that is not rejected;

e) filtering each new incoming CSM to determine whether said CSM satisfies at least one predefined filtering criterion, and accepting said incoming CSM if it does not satisfy any of said at least one predefined criterion, or proceeding further with the steps of c) and d) otherwise;

f) using as the filtering criterion a network address of at least one predetermined destination;

g) incrementing a counter (CNT) each time an incoming CSM which has satisfied said at least one predefined criterion and was previously accepted for processing;

h) decrementing said counter (CNT) each time an acknowledgement message which concerns a CSM which has satisfied said at least one predefined criterion and was previously accepted for processing;

i) comparing the current value of said counter (CNT) to said threshold number (Max) to determine whether said incoming CSM should be rejected or processed further; and j) flagging in a memory table each accepted CSM that has satisfied said at least one predefined criterion, whereby each time an acknowledgement message is received, it is determined whether said counter (CNT) should be decremented.

8. A network node adapted for use in a connection-oriented network comprising:
   a) initialization means for predefining a threshold number (Max) as the maximum number of allowed call set up messages (CSMs) to be processed from a plurality of sources by the network node and predefining a time frame window as the time within which no more than the threshold number (Max) CSMs are accepted for processing by the network node for processing;
   b) a detector for detecting each new incoming CSM received by the network node;
   c) a CSM rejection means for rejecting each new incoming CSM if the number of CSMs currently being processed by the network node equals the threshold number (Max); or the number of CSMs accepted for processing during the current time frame window equals the threshold number (Max);
   d) a CSM acceptance means for accepting each new incoming CSM that is not rejected;
   e) a CSM filter for filtering each new incoming CSM to determine whether said CSM satisfies at least one predefined filtering criterion, and accepting said incoming CSM if it does not satisfy any of said at least one predefined criterion, or providing the CSM to the CSM rejection means otherwise;
   f) the filtering criterion comprises a network address of at least one predetermined destination;
   g) a counter (CNT) that is incremented each time an incoming CSM which has satisfied said at least one predefined criterion and is accepted processing and is decremented each time an acknowledgement message which concerns CSM which has satisfied said at least one predefined criterion and was previously accepted for processing;
   h) a comparator for comparing the current value of the counter (CNT) to with the threshold number (Max) to determine whether said incoming CSM should be rejected or processed further; and
   i) a memory table in which each accepted CSM is flagged when it has satisfied said at least one predefined criterion, whereby each time an acknowledgement message is received, it is determined whether said counter (CNT) should be decremented.

9. An article of manufacture comprising a processor useable medium having a processor readable program embodied in said medium, wherein the processor readable program when executed on a network nodes causes the network node to:
   a) predefine a threshold number (Max) as the maximum number of allowed call set up messages (CSMs) to be processed from a plurality of sources by the network node and predefine a time frame window as the time within which no more than the threshold number (Max) CSMs are accepted for processing by the network node for processing;
   b) detect each new incoming CSM in the network node;
   c) reject each new incoming CSM if
      the number of CSMs currently being processed by the network node equals the threshold number (Max); or
      the number of CSMs accepted for processing during the current time from window equals the threshold number (Max);
   d) accept each new incoming CSM that is not rejected;
   e) filter each new incoming CSM to determine whether said CSM satisfies at least one predefined filtering criterion, and accepting said incoming CSM if it does not satisfy any of said at least one predefined criterion, or proceeding further with the steps of c) and d) otherwise;
   f) the filtering criterion includes a network address of at least one predetermined destination;
   g) increment a counter (CNT) each time an incoming CSM which has satisfied said at least one predefined criterion and is accepted for further processing;
   h) decrement said counter (CNT) each time an acknowledgement message which concerns CSM which has satisfied at least one predefined criterion and was previously accepted for further processing;
   i) compare the current value of said counter (CNT) to said threshold number (Max) to determine whether said incoming CSM should be rejected or processed further; and
   j) flag in a memory table each accepted CSM that has satisfied said at least one predefined criterion, whereby each time an acknowledgement message is received, it is determined whether said counter (CNT) should be decremented.

10. A network node comprising:
   a) means for predefining a threshold number (Max) as the maximum number of allowed call set up messages (CSMs) to be processed from a plurality of sources by the network node;
   b) means for detecting each new incoming CSM in the network node;
   c) means for rejecting each new incoming CSM if the number of CSMs currently being processed by the network node equals the threshold number (Max);
   d) means for accepting each new incoming CSM that is not rejected;
   e) means for predefining a time frame window as the time within which no more than the threshold number (Max) CSMs are accepted for processing by the network node for processing;
   f) means for rejecting each new incoming CSM if the number of CSMs accepted for processing during the current time frame window equals the threshold number (Max);
   g) means for filtering each new incoming CSM to determine whether said CSM satisfies at least one predefined filtering criterion, and accepting said incoming CSM if it does not satisfy any of said at least one predefined criterion;
   h) means for incrementing a counter (CNT) each time an incoming CSM which has satisfied said at least one predefined filtering criterion and was previously accepted for processing;
   i) means for decrementing said counter (CNT) each time an acknowledgement message which concerns a CSM which has satisfied said at least one predefined criterion and was previously accepted for processing;
   j) means for comparing the current value of said counter (CNT) to said threshold number (Max) to determine whether said incoming CSM should be rejected or processed further; and
   k) means for flagging in a memory table each accepted CSM that has satisfied said at least one predefined criterion, whereby each time an acknowledgement message is received, it is determined whether said counter (CNT) should be decremented.

11. The apparatus as in claim 10 further comprising:
the filtering criterion having a network address of at least one predetermined destination.

12. A method for preventing signaling congestion in a node, comprising:
   a) predefining a threshold number (Max) as the maximum number of allowed call set up messages (CSMs) to be processed from a plurality of sources by the network node;
   b) detecting each new incoming CSM in the network node;
   c) rejecting each new incoming CSM if
      the number of CSMs currently being processed by the network node equals the threshold number (Max);
   d) accepting each new incoming CSM that is not rejected;
   e) predefining a time frame window as the time within which no more than the threshold number (Max) CSMs are accepted for processing by the network node for processing;
   f) rejecting each new incoming CSM if the number of CSMs accepted for processing during the current time frame window equals the threshold number (Max);
   g) filtering each new incoming CSM to determine whether said CSM satisfies at least one predefined filtering criterion, and accepting said incoming CSM if it does not satisfy any of said at least one predefined criterion;
   h) incrementing a counter (CNT) each time an incoming CSM which has satisfied said at least one predefined filtering criterion and was previously accepted for processing;
   i) decrementing said counter (CNT) each time an acknowledgement message which concerns a CSM which has satisfied said at least one predefined criterion and was previously accepted for processing;
   j) comparing the current value of said counter (CNT) to said threshold number (Max) to determine whether said incoming CSM should be rejected or processed further; and
   k) flagging in a memory table each accepted CSM that has satisfied said at least one predefined filtering criterion, whereby each time an acknowledgement message is received, it is determined whether said counter (CNT) should be decremented.

13. The method, according to claim 12 further comprising:
using as the filtering criterion a network address of at least one predetermined destination.

14. A computer readable media, comprising:
said computer readable media having instructions written thereon for execution on a processor for the practice of the method of claim 1 or claim 7 or claim 12.

15. Electromagnetic signals propagating on a computer network, comprising:
said electromagnetic signals carrying instructions for execution on a processor for the practice of the method of claim 1 or claim 7 or claim 12.

* * * * *